June 12, 1956 L. THOMPSON ET AL 2,750,449

LONG PLAYING MAGNETIC TAPE RECORDER

Filed Nov. 7, 1951 5 Sheets-Sheet 1

INVENTORS
LINCOLN THOMPSON
FRANK E. RUNGE
WILLIAM H. LYON

BY H. G. Manning
ATTORNEY

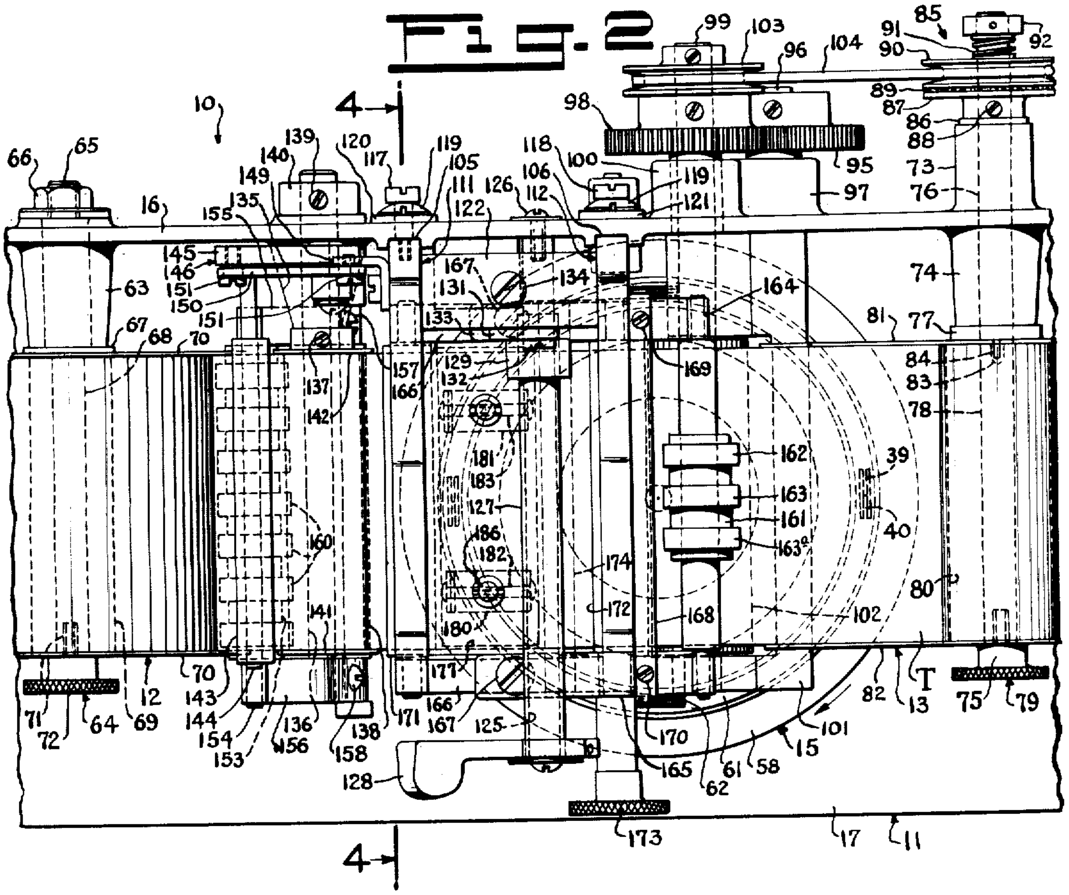
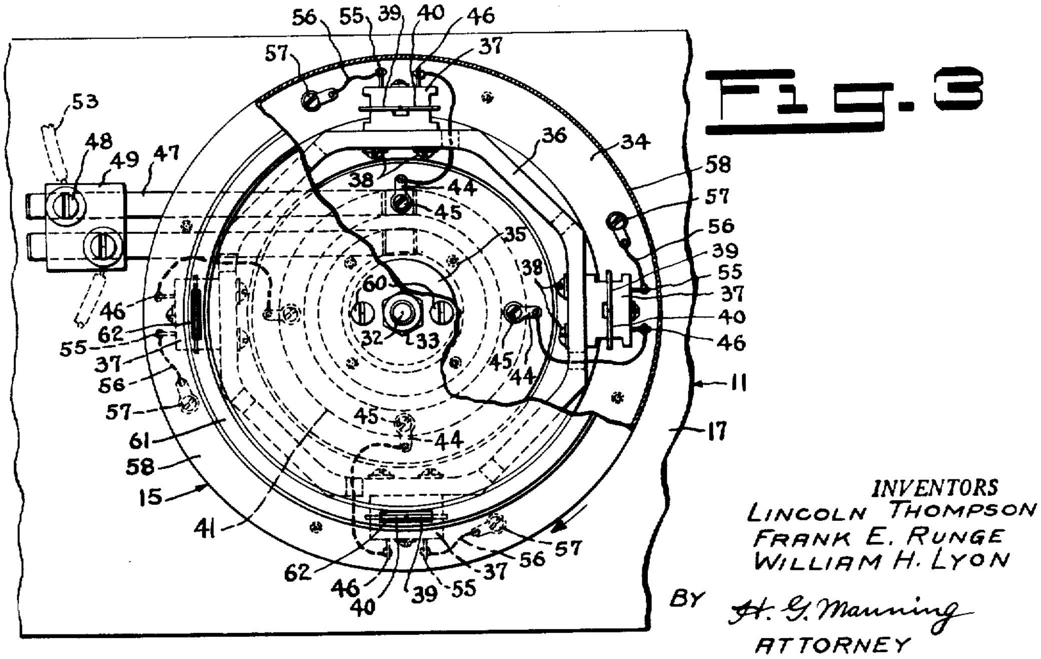
FIG. 3
INVENTORS
LINCOLN THOMPSON
FRANK E. RUNGE
WILLIAM H. LYON
BY H. G. Manning
ATTORNEY June 12, 1956 L. THOMPSON ET AL 2,750,449

LONG PLAYING MAGNETIC TAPE RECORDER

Filed Nov. 7, 1951 5 Sheets-Sheet 3

INVENTORS
LINCOLN THOMPSON
FRANK E. RUNGE
WILLIAM H. LYON

BY H. G. Manning
ATTORNEY

LONG PLAYING MAGNETIC TAPE RECORDER

Filed Nov. 7, 1951

INVENTORS
LINCOLN THOMPSON
FRANK E. RUNGE
WILLIAM H. LYON

BY H. G. Manning
ATTORNEY

INVENTORS
LINCOLN THOMPSON
FRANK E. RUNGE
WILLIAM H. LYON

BY H. G. Manning
ATTORNEY

United States Patent Office 2,750,449
Patented June 12, 1956

2,750,449

LONG PLAYING MAGNETIC TAPE RECORDER

Lincoln Thompson, Cheshire, Frank E. Runge, Branford, and William H. Lyon, Orange, Conn., assignors to The Soundscriber Corporation, New Haven, Conn., a corporation of Connecticut Application November 7, 1951, Serial No. 255,184

22 Claims. (Cl. 179—100.2)

This invention relates to sound recording devices, and more particularly to a long-playing magnetic recording and playback device wherein the sound is recorded transversely on a wide flexible strip of tape coated on one side with an emulsion of magnetic particles.

One object of this invention is to provide a practical recording apparatus of the above nature wherein a series of successive, parallel, arcuate sound tracks are impressed laterally across a slowly moving recording tape by means of a plurality of electro-magnetic transducer heads radially disposed on a rotating member.

Another object of this invention is to provide a device of the above nature wherein a novel mechanism is provided to insure that the pole faces of the transducer heads scanning the record tape will contact the magnetic surface of the tape with uniform and positive pressure, whereby air gaps will be avoided and there will be no variation in sound signal amplitude.

A further object is to provide a readily adjustable apparatus for controlling the tape feeding mechanism, whereby the recorded sound tracks on the tape may be brought into synchronism relative to the scanning pole faces during playback.

A further object is to provide a novel mechanism and means whereby the tape may quickly and easily be threaded into the apparatus both for recording and playback.

A further object is to provide a device of the above nature wherein mechanism is provided for gently urging the edge of the record tape against a reference flange, whereby normal variations in tape width will not affect proper synchronization between the recorded sound tracks and the transducer heads.

A further object is to provide a device of the character described, which may be used for simultaneously recording two or more sound signals or intelligences on a single tape.

A further object resides in the provision of a device of the above nature, wherein indexing or logging may readily be accomplished by manual marking on the back of the tape during recording, whereby any particular portion or portions of said tape may quickly, accurately, and conveniently be located for playback.

A further object is to provide a device of the character described that will be readily adaptable, by means of a simple adjustment, for "scrambling" the intelligence or messages recorded on the tape, and which may be "unscrambled" for reproduction only on the same machine or a similar machine, in accordance with the particular adjustment made to the recording machine.

A further object is to provide a device of the above nature which will be simple in construction, inexpensive to manufacture, easy to install and manipulate, compact, ornamental in appearance, and very efficient and durable in use.

With these and other objects in view there have been illustrated on the accompanying drawings two forms in which the invention may conveniently be embodied in practice.

In the drawings:

Fig. 2 is a top plan view of the apparatus.

Fig. 3 is a top plan view, with sections broken away, of the turntable equipped with four transducer heads for recording a single sound signal or channel.

Figure 1:
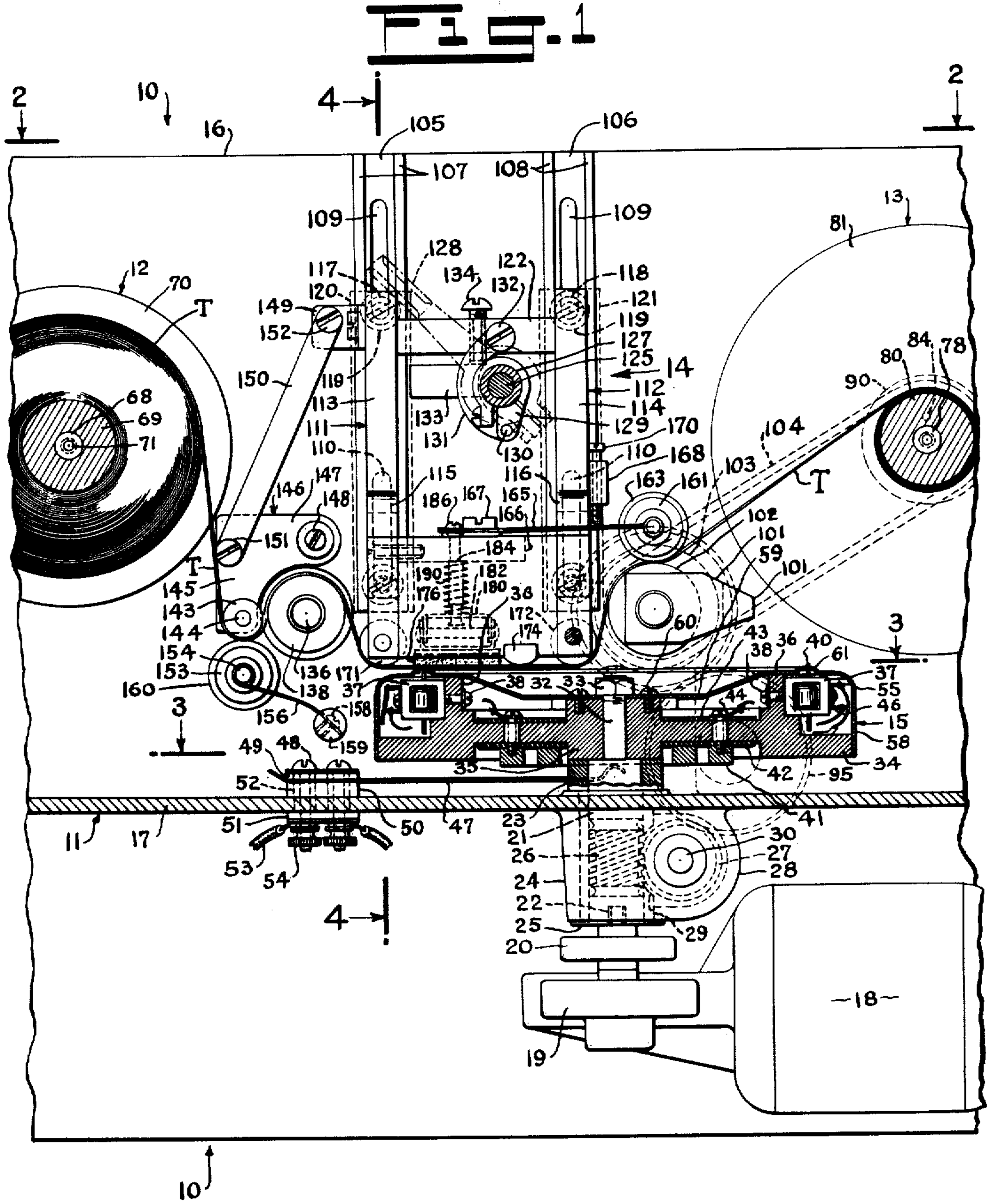
Fig. 1 represents a front view of the improved magnetic recording and reproducing apparatus showing the transducer head turntable in vertical cross-section.

Referring now to the drawings, in which like reference numerals denote corresponding parts throughout the several views, the numeral 10 designates generally the improved magnetic recorder-reproducer apparatus embodying the invention; the same comprising a cast metal chassis 11 on which are mounted a tape feed reel 12, a tape pick-up reel 13, a pressure plate and gate mechanism 14, a transducer head turntable assembly 15, and associated drive mechanism, all hereinbelow described in detail.

Figure 4:
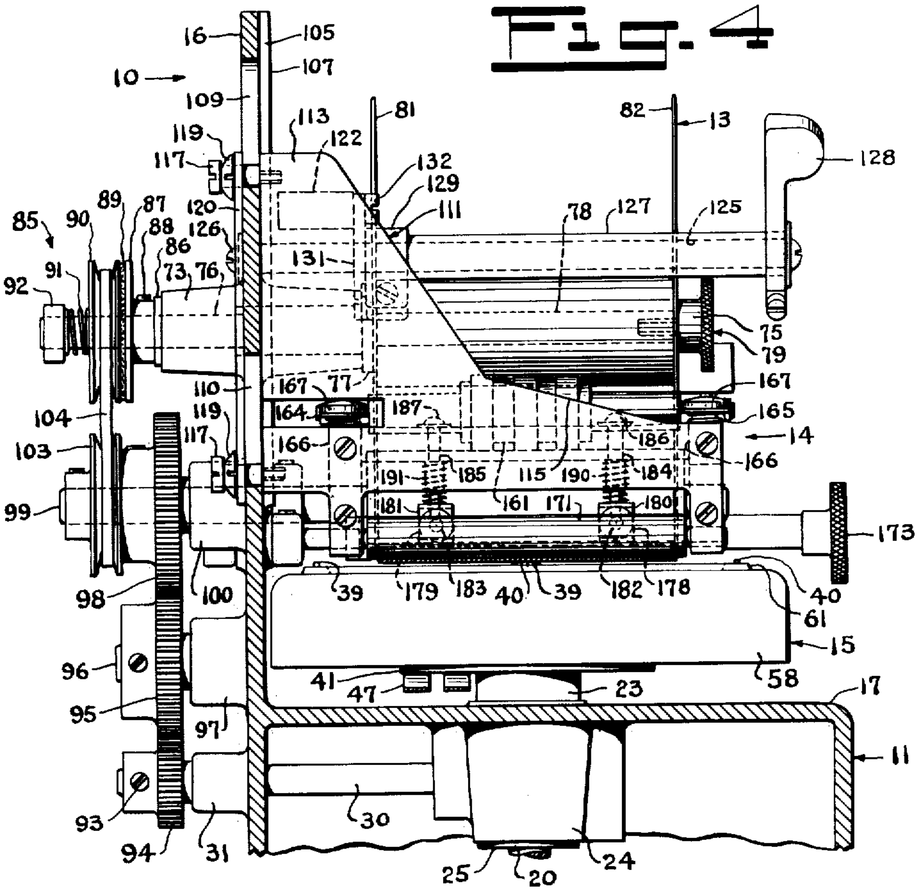
Fig. 4 is a vertical cross-sectional view taken along the line 4—4 of Fig. 2, looking in the direction of the arrows.

Referring now to Figs. 1, 2, and 4, it will be seen that a wide recorder tape T passes from the feed reel 12, between the pressure plate and gate mechanism 14, and the top of the transducer head turntable assembly 15, to the pick-up reel 13.

As will be fully understood from the following detailed description, the turntable assembly 15 rotates at a constant speed in timed relation with respect to the translation of the tape, whereby successive parallel arcuate transverse sound tracks will, by means of the circularly disposed transducer units on the turntable, be produced on the magnetic tape T during recording, and may be reproduced whenever desired by "playing back."

Proceeding now with the detailed description, and referring to Figs. 1 and 4, it will be seen that the chassis 11 comprises a vertical, rectangular side wall 16 supported by an integrally formed skirted shelf 17, extending horizontally from said side wall 16. The skirted shelf 17 forms a sub-chassis within which a turntable and tape feed drive motor 18 (Fig. 1) (preferably synchronous for constant speed performance), is mounted against the side wall 16 by any convenient means (not shown). The motor 18 is provided with an integrally supported gear reduction unit 19 which serves to reduce the output speed to about 20 R. P. M.—the output thereof being delivered vertically through a flexible coupling unit 20 to a turntable drive spindle 21, which is tapped at its lower end for receiving the reduced end 22 of the output shaft of said flexible coupling.

The drive spindle 21 is journaled within a headed bushing 23 seated in a downwardly extending journal boss 24, cast in the horizontal shelf 17 of the chassis 11. To prevent upward withdrawal of the spindle 21, provision is made of a washer 25 bearing against the underside of the journal boss 24 and clamped between the coupling unit 20 and said spindle.

The spindle 21 (Fig. 1) is provided with a vertical central worm portion 26 cooperative with a horizontal worm gear 27, rotatably disposed within a housing portion 28 of the boss 24. To this end, the headed bushing 23 is provided with a suitable side opening 29 to allow intermeshing of the worm gear with the spindle worm.

The horizontal worm gear 27 is fixed on a rearwardly extending horizontal drive shaft 30 (Fig. 4), journaled at its outer end in an outwardly extending bearing boss 31 formed in the side wall 16 of the chassis. As is hereinbelow fully described, the drive shaft 30 furnishes drive power to the tape feed and take-up mechanism (see Fig. 4).

The vertical drive spindle 21 is provided on its upper end with a threaded stud portion 32 upon which the transducer head turntable assembly 15 is centrally mounted and fixed for rotation with said spindle by means of a nut 33 (see Figs. 1 and 3).

The transducer head turntable assembly 15 comprises a circular casting 34 (Fig. 1) provided with a central spindle-mounting hub portion 35, and an upstanding, coaxially symmetrical, outer, octagonal wall 36 against the alternate outside surfaces of which four magnetic transducer heads 37 are mounted as by pairs of machine screws 38. The transducer heads 37 are of known construction, and are provided with the usual centrally-gapped, horizontally aligned pole pieces 39, 40.

It is to be understood however, that three, or any number greater than four, of such heads may be employed if desired, dependirng upon the width of the tape T and the diameter of rotation of the heads.

Figure 6:
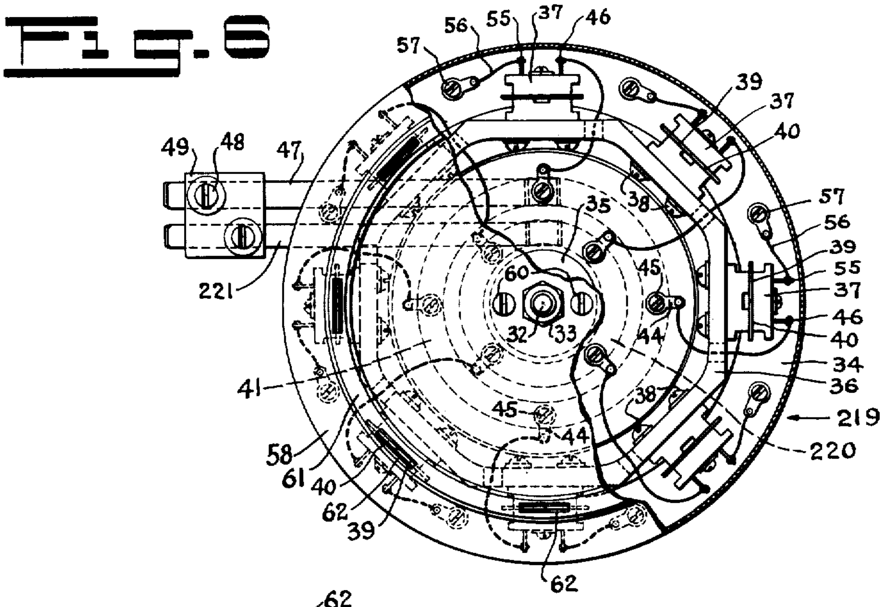
Fig. 6 is a top plan view similar to that shown in Fig. 3, but illustrating a modified form of turntable equipped with eight transducer heads for simultaneously recording two sound signals or channels.

In order to electrically connect the transducer heads 37 to the electrical system of the recorder 10, provision is made of slip contact means comprising a flat annular slip ring 41 coaxially disposed against the underside of the circular casting 34 and insulated therefrom by an interdisposed flat annular insulation disk 42. A similar insulating disk 43 is provided against the upper face of the circular casting 34 for the purpose of insulating four terminal lugs 44 and four associated conductive mounting screws 45 electrically connecting one terminal 46 of each of the transducer heads 37 to the slip ring 41 (Fig. 6).

An elongated leaf spring brush 47 (Figs. 3 and 12) having one end contacting the underside of the slip ring 41, is fixed by means of a machine screw 48 to the chassis shelf 17, being insulated therefrom by three aligned insulating blocks 49, 50, 51 (Fig. 1) and a central insulating bushing 52 in the usual manner (Fig. 1). An insulated conductor wire 53, attached by a thumb nut 54, leads to the electrical circuit for the recorder, hereinbelow described. The remaining terminals of the transducer heads 37 are each connected by outer lug-terminated wires 56 and machine screws 57 to the circular casting 34, whereby parallel connection to the rotating transducer heads is made through the metal chassis and the conductor wires 53 (Figs. 1 and 3).

Figure 5:
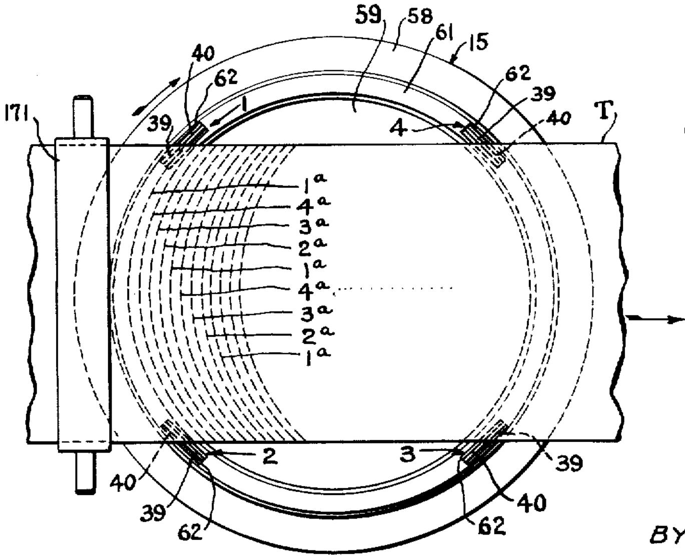
Fig. 5 is a schematic drawing illustrating the relative disposition of the rotating turntable unit and the longitudinally moving tape for developing the successive arcuate transverse sound tracks thereon.

A skirted thin disk-like cover 58 encloses the top of the transducer head turntable assembly (Fig. 1), said cover being provided with a downwardly-offset central portion 59 fixed to the top of the mounting hub 35, as by machine screws 60. The cover 58 is further provided with an upwardly embossed annular rib portion 61 (Figs. 3 and 5), having four tangential slots 62 through which the transducer pole pieces 39, 40 extend upwardly a slight distance. It will be understood that the annular rib portion 61 of the turntable assembly 15, together with the slightly protruding pole pieces 39, 40, will bear upon and slip against the underside of the overlying recording tape T when the machine is operating. The cover 58 will also serve the purpose of an electromagnetic shield for the transducer heads.

The left side wall 16 of the chassis 11 is provided with an inwardly extending apertured tapered boss 63 for supporting a horizontal tape-feed reel spindle 64 (Fig. 2) comprising a threaded reduced end portion 65 fixed within said boss by means of a retaining nut 66. The spindle 64 has an integral flanged portion 67 bearing against the inner side of the boss 63, and also has an integral, inwardly-extending reel-carrying shank portion 68 on which the tape feed reel 12 is rotatably mounted.

Surrounding the shank 68 is a tubular core 69 having circular flanges 70 fixed thereto at each end. The end of the spindle 64 is tapped as at 71 to such a depth that a thumb screw 72 may be turned therein to retain the reel 12 on the spindle for free rotational motion with a minimum of side play.

The right side wall 16 of the chassis is also provided with a pair of aligned, outwardly and inwardly extending apertured bosses 73, 74, respectively, for embracing tape take-up reel spindle 75, as shown in dotted lines (Fig. 2). The spindle 75 has a bearing portion 76 rotatably disposed within said bosses 73, 74, and an integral flanged portion 77 bearing against the inner side of the boss 74. It also has an integral inwardly-extending spool-carrying portion 78 tapped at its inner end to receive a thumb screw 79 for securing the tape take-up reel 13 thereon.

The tape take-up reel 13 includes a tubular core 80 having a pair of end circular flanges 81, 82 respectively. The circular flange 81 and the tubular core 80 are provided with an inwardly extending circular recess 83 (Figs. 2 and 4) for receiving a reduced lug 84 extending outwardly from the flanged portion 77 of the take-up reel spindle 75, whereby the tape take-up reel will be locked thereon.

The outwardly extending end of the bearing portion 76 of the tape take-up reel spindle 75 is provided with a slip clutch and pulley mechanism generally indicated by the numeral 85, driven by the drive shaft 30, as hereinbelow described, in order to cause the recorder tape to be continuously "taken up" and snugly wound on the take-up spool 13, regardless of the amount of tape already wound thereon.

The slip clutch and pulley mechanism 85 (Figs. 2 and 4), comprises a washer 86 on the spindle 75 bearing against the end of the apertured boss 73, a clutch face drum 87 secured on said spindle as by a set screw 88, an annular clutch lining 89 embracing said clutch face drum, a pulley 90 rotatably disposed on said spindle 75, and a coiled compression spring 91 retained by a clutch retaining bushing 92. The bushing 92 is rigidly secured at the outer end of the spindle 75 and said compression spring 91 serves to urge the inner face of the pulley 90 against the clutch lining 89 for frictionally driving the tape take-up spool 13.

The outer end of the drive shaft 30 has secured thereon, as by a set screw 93, a gear 94, which is intermeshed with an idler gear 95 fixed on a short shaft 96 journaled in a boss 97 extending outwardly from the side wall 16 of the chassis (Fig. 4). The idler gear 95, in turn, is intermeshed with a feed roller gear 98 fixed on a tape drive shaft 99, journaled at one end in an apertured boss 100 extending outwardly from the chassis side wall 16. The inner end of the tape drive shaft 99 is rotatably supported by a horizontally-extending, apertured, yoke-like casting 101 having its rearward end fixed against the inner side of the side wall 16 in alignment with the apertured boss 100 (Figs. 1 and 2).

Securely mounted on the tape drive shaft 99 between the end arms of the yoke-like casting 101 is a cylindrical drive roller 102, which, in cooperation with a feed pressure roller 161 (Fig. 1) mounted on the gate mechanism 14 (to be later described) serves to advance the record tape in timed relation with respect to the rotation of the transducer head turntable assembly 15. There is also fixed on the tape drive shaft 99, adjacent the feed roller gear 98, a take-up drive pulley 103, which is located below and in vertical alignment with the tape take-up reel pulley 90, said pulleys being interconnected by a small belt 104 for frictionally driving the tape take-up reel 13.

Figures 7, 8:
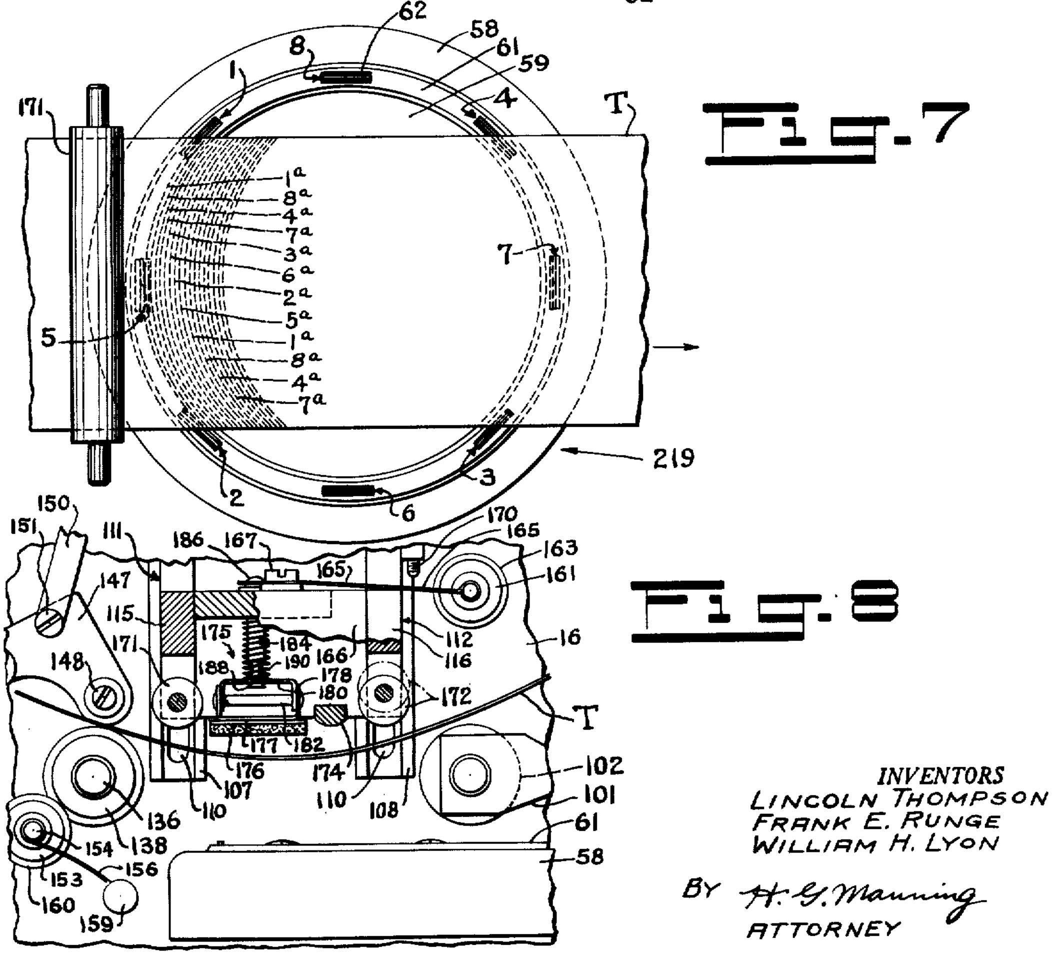
Fig. 7 is a schematic drawing similar to that of Fig. 5, illustrating the development of parallel interspaced sound tracks traced by the eight transducer heads shown in Fig. 6.
Fig. 8 is a front view, with sections broken away, of the pressure plate and gate mechanism shown in open position, for permitting the insertion or withdrawal of the magnetic tape.

The pressure plate and gate mechanism 14 is slidably supported in a pair of vertical grooves 105, 106, formed by pairs of vertical guide tracks 107, 108 formed in the side wall 16 of the chassis 11 (Figs. 1 and 2). Centrally located with the grooves 105, 106 are upper and lower longitudinal slots 109, 110, respectively (Figs. 1, 4, and 8).

The pressure plate and gate mechanism 14 includes a framework of left and right side walls 111, 112, having similar upper triangular portions 113, 114, respectively, slidably embraced endwise within the grooves 105, 106 and lower horizontally-extending offset portions 115, 116 for supporting the mechanism hereinbelow described.

In order to slidably retain the side walls 111, 112 of the pressure plate and gate mechanism 14 within their respective grooves 105, 106, provision is made of two pairs of machine screws 117, 118 (Figs. 2 and 4), having reduced threaded ends which extend through the upper and lower vertical slots 109, 110 and are threaded in tapped apertures within said side walls 111, 112 to insure a firm frictional sliding action between said side walls 111, 112, and the side wall 16 of the chassis 11. The machine screws 117, 118, are provided with resilient washers 119, and vertically-extending apertured interconnecting plates 120, 121, slidably disposed against the outer face of the side wall 16.

Figure 10:
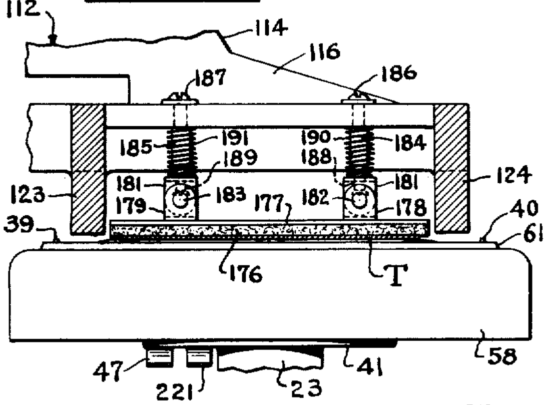
Fig. 10 is a partial side-elevational view of the pressure plate and gate mechanism in closed or operating position, shown partly in section to clearly illustrate the construction of the pressure plate and its resilient mounting mechanism.

The upper triangular portions 113, 114 of the left and right side walls 111, 112, are interconnected by means of a horizontal rectangular brace bar 122 (Figs. 1 and 4), said interconnection being made as by machine screws, not shown. The offset portions 114, 115, are similarly braced at their inner and outer ends by the interconnecting bars 123, 124, respectively (Fig. 10).

*Toggle lever mechanism*

In order to permit manual raising and lowering of the pressure plate and gate mechanism 14, provision is made of a toggle actuated lever mechanism. This consists of a horizontal cylindrical shaft 125 (Fig. 1), fixed at one end against the inside of the side wall 16 as by a machine screw 126 (Fig. 4), said shaft having rotatably mounted thereon a cylindrical sleeve 127 on which is fixed at its outwardly extending end, a thumb crank 128 (Figs. 1, 2, and 4), said shaft having on its inner end a clamp member 129 provided with an offset pivot pin 130 (Fig. 1). An arcuate toggle link 131 is pivotally connected at one end to the pivot pin 130, and at its other end to the side of the brace bar 122 by means of a pivot screw 132.

Adjustable means is provided to limit the downward closing movement of the pressure plate and gate mechanism 14. This comprises an abutment block 133 (Fig. 2) fixed to and extending inwardly from the side wall 16 of the chassis beneath the brace bar 122 (Fig. 1). Provision is also made of a vertical headed screw 134 (Fig. 1) threaded in a tapped opening in the brace bar 122 having its downwardly extending end engaging the top surface of the abutment block 133. It will be evident that the engagement of the stop screw 134 with the abutment block 133 will prevent further downward movement of the pressure plate and gate mechanism 14, and that the limit of downward movement thereof may be readily varied by adjusting said stop screw.

Fig. 1 illustrates the pressure plate and gate mechanism in its downward closed position. To open the gate for the insertion or removal of the record tape, it is merely necessary to turn the thumb crank 128 clockwise, whereupon the arcuate toggle link 131 will be directed upward, carrying with it, by means of its pivotal interconnection with the brace bar 122, the entire pressure plate and gate mechanism 14 as a unit into the open position shown in Fig. 8.

The side wall 16 of the chassis 11 is also provided with an inwardly extending apertured boss 135 (Fig. 2) for rotatably supporting a tape tension roller shaft 136 (Fig. 8), upon which is fixed as by a set screw 137, a tape tension roller 138, one end of which bears against the end of the apertured boss 135. The outer end of the shaft 136 has secured thereon, as by the set screw 139, a retaining bushing 140, to prevent axial movement of said shaft.

The ends of the tension roller 138 are formed with inner and outer peripheral shoulders or flanges 141, 142 respectively.

The shaft 136 is slightly canted in a vertical direction, so that the inner edge of the tape will always be urged against the inner side of the flange 141, whereby said inner edge will serve as a reference for the horizontal alignment of the record tape. It will be understood, however, that instead of "canting" the shaft 136, said shaft may be tapered within the spirit and scope of the present invention. This construction insures that a tape recorded on one machine may be played back on any other similar machine without distortion being introduced by improper horizontal alignment of the tape. It is also to be noted that the herein-detailed horizontal alignment reference mechanism described above obviates any difficulties which might be encountered if there was a variation in width of the tape used.

*Tape guide member*

In order to maintain the tape in contact with a large portion of the cylindrical area of the tape tension roller 138, a small retractable auxiliary cylindrical guide member 143 (Fig. 1) is provided. The guide member 143 is fixed on a shaft 144 secured at one end in one arm 145 of a triangular bell crank lever 147. The other arm 146 of the bell crank lever 147 is pivotally mounted against the side wall 16 of the chassis by means of a pivot screw 148. The central portion of the bell crank lever 146 is connected by a link 150 to an angular bracket 149 (Figs. 1 and 2) fixed against the upper portion 113 of the side wall 111 of the pressure plate and gate mechanism 14, and pivot screws 151, 152, respectively.

When the pressure plate and gate mechanism 14 is raised to the position shown in Fig. 8, the elongated link 150 will be carried upwardly, thereby rotating the bell crank lever 146 so as to raise and withdraw the guide member 143 from the tape tension roller 136. It will be evident, therefore, that when the pressure plate and gate mechanism 14 is raised, the tape guide member will be in such position as to allow approximately straight line insertion or removal of the record tape.

*Second tape tension roller*

In order that the tape T may be stretched across the path of travel of the transducer head pole pieces, provision is made of a second tape tension roller 153 (Figs. 1 and 8), rotatably mounted on a shaft 154 which is fixed at its ends to leaf springs 155, 156. The ends of the springs 155, 156 are fixed, as by screws 157, 158 to flat portions milled on a rod 159 fixed to and extending inwardly from the side wall 16 of the chassis. The tension roller 153 is fitted with a plurality of uniformly spaced annular rubber rings 160, in order to establish good frictional contact with the tape.

*Feed pressure roller*

A pressure roller 161 (Figs. 1 and 2) similar to the tape tension roller 153, but having only three centrally located annular rubber friction rings 162, 163, **163*a*, is resiliently mounted by means of a pair of leaf springs 164, 165 (Figs. 1 and 8), upon a horizontal support shelf 166, said shelf being fixed as by a plurality of headed screws 167, against the inside of the offset portion 116, of the left side wall 111**.

The shelf 166 is so located that the tension roller 153 will bear resiliently against the recorder tape T at the portion thereof which embraces the underside of the auxiliary guide member 143 whenever the pressure plate and gate mechanism 14 is in its downward or closed position (Fig. 1).

Similarly, the feed pressure roller 161 will bear against the upper surface of the tape drive roller 102, whenever the pressure plate and gate mechanism 14 is in closed position, thereby insuring a positive frictional drive of the tape T.

In order to control the amount of pressure exerted by the feed pressure roller 161, provision is made of a horizontal cross bar 168 (Figs. 1 and 2) secured to the outside of the right side wall 112, above the leaf springs 164, 165, said bar having tapped holes to receive a pair of vertical machine screws 169, 170, having their lower ends in alignment with central portions of the springs 164, 165, respectively.

Referring to Figs. 1 and 2, it will be seen that the screws 169, 170 will engage the upper surface of the spring leaves 164, 165 whereby the pressure of the roller 161 against the tape and tape drive roller 102 may be readily controlled.

It will also be seen (Fig. 8) that when the pressure plate and gate mechanism 14 is raised to open position, the feed pressure roller 161 will be lifted, thereby withdrawing it from the record tape T.

*Gate roller*

Figure 11:
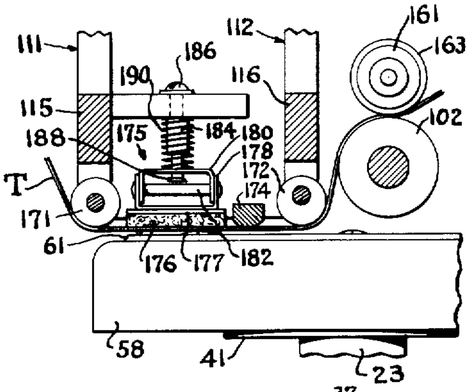
Fig. 11 is a front elevational view of the same.

Provision is also made of a gate roller 171 (Figs. 1, 5, 7, and 8), located in the lower left-hand corner of the pressure plate and gate mechanism 14, and journaled horizontally in the inner and outer interconnecting bars 123, 124. In the lower right hand corner of the pressure plate and gate mechanism 14, journaled horizontally between the inner and outer interconnecting bars 123, 124, is a synchronization cam 172 (Fig. 11), said cam being generally of the same size as the gate roller 171, but having eccentrically-located, aligned, bearing ends. The outer end of the synchronization cam 172 has fixed to it an outwardly-extending thumb wheel 172 (Fig. 2), whereby the position of the cam may be adjusted as desired.

Fixed perpendicularly between the inner and outer connecting bars 123, 124 of the pressure plate and gate mechanism 14, and disposed intermediate the gate roller 171 and the synchronization cam 172, is a guide bar 174 (Figs. 1, 2, and 8), the same being provided with a semicylindrical lower surface which has its lowermost portion in a horizontal plane tangent to the underside of the gate roller 171. It will be evident, therefore, that the portion of the tape T guided between the gate roller 171 and the bar 174 will be maintained in a horizontal plane.

In order to insure perfect tape contact with the moving transducer head pole pieces 39, 40 at all times during arcuate passage of the latter against the underside of the tape, a pressure plate mechanism 175 (Figs. 1, 2, 8, 10 and 11) is provided, which serves to resiliently urge the tape downwardly against said pole pieces and the annular portion 61 of the transducer head cover 58. The pressure plate mechanism 175 is suspended from the horizontal support shelf 166, and comprises a smooth rectangular soft rubber pad 176, cemented or otherwise fixed against the underside of a rectangular base plate 177. The resilient support mechanism for the base plate 177 comprises inner and outer, upwardly-extending U-shaped brackets 178, 179 (Figs. 1 and 9) respectively, fixed to said base plate 177 and pivotally coupled to a pair of downwardly-extending U-shaped brackets 180, 181, respectively, by a pair of transverse, interconnecting headed pivot pins 182, 183, respectively. A pair of vertical supporting studs 184, 195 are secured against the underside of the support shelf 166, as by screws 186, 187, said studs having reduced lower end portions 188, 189, extending through central vertical apertures in the U-shaped brackets 180, 181, respectively. The ends of the reduced end portions 188, 189 are preferably headed over (Fig. 8) to prevent withdrawal of the base plate 177.

A pair of coil springs 190, 191, embracing the supporting studs 184, 185, and acting between the undersurface of the support shelf 166 and the upper surfaces of the U-shaped brackets 180, 181, respectively, provide resiliency to the pressure plate mechanism.

By means of this construction it will be seen that the inner and outer ends of the pressure plate 177 may be moved upwardly independently of one another, thereby insuring that the upward force of the set of pole pieces acting at one end of the pressure plate will not adversely influence the height of the pressure plate at the other end thereof, thus insuring that succeeding sets of pole pieces will make positive contact with the tape T.

*Electrical hookup*

Figure 12:
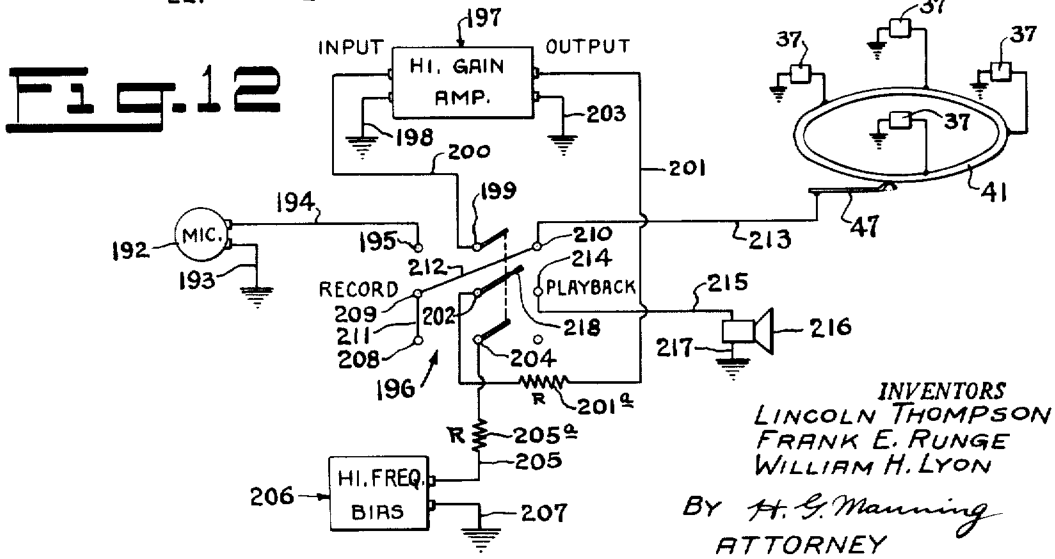
Fig. 12 is a schematic drawing of a typical electrical circuit employed in conjunction with the improved magnetic recorder shown in Figs. 1 through 5.

Considering now the electrical circuits associated with the improved recorder, diagrammatically shown in Fig. 12, the numeral 192 designates a microphone, the same being connected by a wire 193 to the common ground of the recording apparatus, which, in the present instance, is the metal chassis 11. The remaining terminal of the microphone 192 is connected by a wire 194 to the terminal 195 of a triple-pole, double-throw recording-playback switch 196. A high-gain amplifier unit 197 has one input terminal connected to ground, as by the wire 198, and the other input terminal connected to the pole terminal 199 of the switch 196, as by a wire 200. One of the output terminals of the amplifier 197 is connected, as by a wire 201 in which is an isolating resistance **201*a*, to a pole terminal 202 of the switch 196. The other output terminal is connected as by a wire 203** to the ground.

The pole terminal 204 of the switch 196 is connected by a wire 205 including an isolating resistance **205*a* to one output terminal of a high frequency bias supply unit 206, the other output terminal of said unit being connected to ground, as by a wire 207. Terminals 208, 209, 210 of the switch 196 are electrically interconnected by wires 211, 212, said terminal 210 being further connected by a wire 213, to the spring brush 47 for making contact with the slip ring 41**, as hereinabove described.

Each of the revolving transducer heads 37 of the turntable assembly 15 has one terminal grounded to the chassis 11 and the other terminal connected to the slip ring 41 (Fig. 12).

The terminal 214 of switch 196 is connected by a wire 215 to one terminal of the loudspeaker 216. The other terminal of the loudspeaker 216 is connected to the common ground, as by a wire 217. The three arms of the switch 196 are mechanically interconnected and are operated in unison by an insulated switch handle 218.

*Operation*

Considering now the operation of the first form of recorder having four transducer heads, assume that the switch handle 218 of the recording-playback switch is thrown to the left. An electrical circuit will then be completed connecting the microphone 192 to the input circuit of the amplifier 197, said circuit being from ground through the wire 193, the microphone 192, the wire 194, the switch terminals 195, 199, and the wire 200, to one input terminal of the amplifier 197, thence from the other input terminal of said amplifier, through the wire 198, back to ground. When the switch 196 is in this recording position, the output of the amplifier 197 is connected to the four transducer heads 37 in parallel, the circuit being from ground through wire 203, to one amplifier output terminal, thence through wire 201, resistance 201_a_, switch terminal 202 and the central arm of switch 196, to the terminal 209, wires 212, 213 to the spring brush 47, and the slip ring 41, through the transducer heads 37 and thence to ground.

It will be noted that when the apparatus is in "record" position, the output of the high frequency bias supply 206 will be superimposed on the signal output of the sound amplifier fed to the transducer heads 37, said bias circuit being from ground, through wire 207 to the high frequency bias unit 206, thence through wire 205, pole 204, terminal 209, wires 211, 212, 213, to the slip ring 41 and the transducer heads 37, as above detailed.

Since the desirability of supplying a high frequency AC bias voltage to the transducer head when recording on magnetic materials has heretofore been investigated by others, and various circuits therefor have been developed, no claim to those features as such is made herein. However, in order that others may practice the present invention with maximum success, it may be stated that an AC bias frequency of 30,000 CPS has proved very effective for good fidelity recording on paper tape coated with an emulsion of magnetic oxide.

Since the transducer head turntable assembly 15 (Fig. 5) is equipped with four equidistantly spaced transducer heads, numbered 1, 2, 3, 4, arranged in counterclockwise sequence, when the tape T moves to the right in timed relation with respect to the clockwise rotation of said turntable assembly, the pole pieces 39 of the transducer heads 37 will trace a series of spaced successive arcuate tracks on the underside of said tape, as indicated by the dotted lines numbered 1_a_, 2_a_, 3_a_, 4_a_, respectively, representing the centerlines of the tracks. The transducer heads 37, being energized by the sound recording circuit hereinabove detailed, will induce variations in the magnetic characteristics of the tape along the record tracks in accordance with the signal recorded.

It will be noted that the width of the tape T used should be equal to the quadrant between transducer head pole pieces 39, whereby there will be only very slight overlap in the signals recorded on the tape. Thus, as will be evident from an inspection of Fig. 5, the transducer 1 leaves the tape after having described its arcuate path 1_a_, just as the transducer 2 begins to engage the tape for the beginning of its arcuate path. The very slight overlap or gap which thus occurs is almost unnoticeable in speech due to its short duration (of the order of .01 second).

*Playback operation*

Considering now the operation of the improved recorder when playing back a recorded tape T, the reel of tape will first be secured on the tape feed reel spindle 64, and the tape then threaded from left to right (Fig. 1) to the tape pickup reel 13 (Figs. 1 and 2) in the manner hereinabove detailed. The pressure plate and gate mechanism 14 will then be closed to place the apparatus in readiness for operation.

The record-playback switch 196 will next be thrown to the right, to complete a circuit from the transducer heads 37, through the amplifier 197 to the loudspeaker 216. This circuit (Fig. 12) can be traced from ground, through the transducer heads 37, thence to the slip ring 41, through the spring brush 47, wire 213, now closed-circuited switch terminal 218 and pole terminal 199, and wire 200 to one input terminal of the high-gain amplifier 197, thence from the other input terminal thereof, through the wire 198 back to ground.

The output circuit of the amplifier 197 may be traced from ground, through wire 203, to one output terminal of the amplifier, thence, from the other output terminal thereof through wire 201, resistance 201_a_, now closed-circuited switch pole 202 and terminals 218, 214, through wire 215 to one terminal of the loudspeaker 216, thence, from the remaining terminal thereof, by a wire 217 to ground, completing the playback circuit.

The drive motor 18 will next be set in operation by closing an ordinary on and off switch (not shown), in its energization circuit, whereupon the transducer head pole pieces 39, 40 will scan across the underside of the tape transcription lines in successive arcuate paths, just as in recording. Since it is necessary in reproduction that the pole pieces 39, 40 be in close alignment with the tracks of the tape scanned, in order that the recorded magnetic tracks may influence the pole pieces of the transducer heads, use is made of the hereinabove described synchronization cam 172 (Figs. 1 and 8). Referring to Fig. 1, it will be seen that as the cam 172 is turned by means of the thumb wheel 173 (Fig. 2), the length of tape stretched between the scanning pole pieces 39, 40 and the tape drive roller 102, may be adjusted. The eccentricity of the synchronization cam 172 is such as will allow for lateral movement of the tape relative to the scanning pole pieces for at least half the distance between successive tracks, whereby vertical alignment or synchronization of the recorder with a recorded tape may be readily accomplished.

*Operation of second form of invention*

Figure 9:
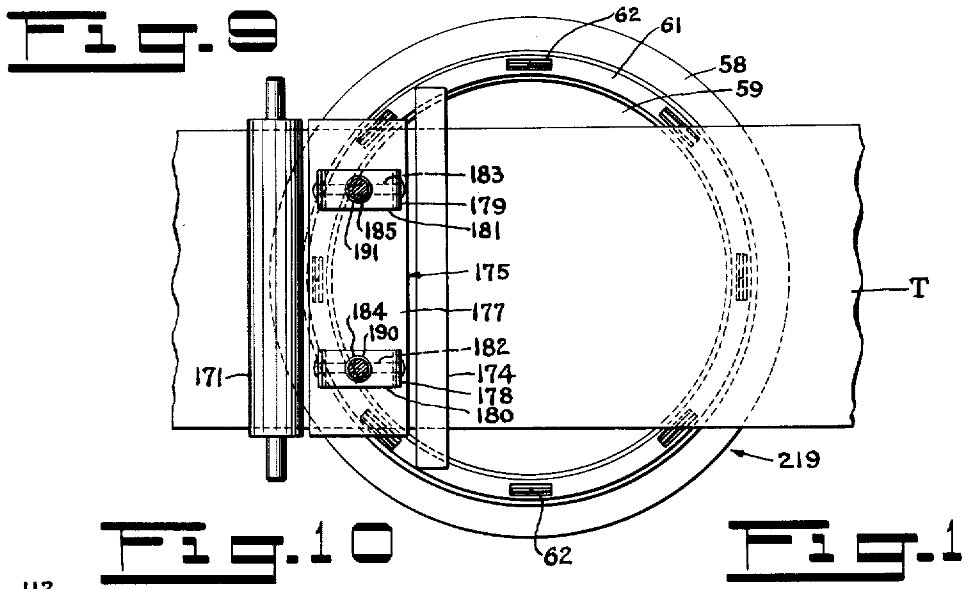
Fig. 9 is a top plan view of the modified turntable, together with lower portions of the pressure plate and gate mechanism.

Figs. 6, 7, and 9 illustrate a turntable assembly 219 provided with eight transducer heads for simultaneously recording two sound channels on a single tape. It will be noted that this modified turntable assembly is the same as that shown in Figs. 3 and 5, except that it includes the four transducer heads 5, 6, 7, 8 alternately intermediate the four transducer heads 1, 2, 3, 4.

Referring to Fig. 6, it will be seen that electrical connection is made to transducer heads 5, 6, 7, 8 by means of a separate slip ring 220 and spring brush 221 similar to the corresponding parts described in connection with the first form of the invention. The spring brush 221 will be connected to a separate electrical system similar to that above described in connection with transducer heads 1, 2, 3, 4.

Referring now to Fig. 7, it will be seen how the two sets of transducer heads (1 through 4 and 5 through 8) will interspace their arcuate sound tracks on the moving tape to form successive sound tracks in the following order: 1_a_, 8_a_, 4_a_, 7_a_, 3_a_, 6_a_, 2_a_, 5_a_.

The operation during playback will be the same as that described in the single channel recording, except, of course, that two playback amplifiers 197, will be used, one for each channel of the modified system. It is to be noted that with the two channel system it may be necessary for the tape to travel at a somewhat greater speed with respect to the turntable assembly 15 in order that there be sufficient space between successive interspaced channel sound tracks to prevent cross-talk or interference between the scanned track and its adjacent track.

*"Scrambling"*

Referring again to Fig. 5, it will be noted that the transducer heads 37 are normally symmetrically mounted with respect to the vertical axis of the transducer head turntable assembly 15, whereby their successive respective sound tracks 1_a_, 4_a_, 3_a_, 2_a_ are produced on the tape.

However, by mounting the transducer heads along different radial lengths, "scrambling" of the sound tracks on the tape may be accomplished. For example, if the second transducer head 37 were radially displaced so that it would produce its track spaced at a distance of three normal tracks from that of the first transducer head 37 by mounting it at a smaller radius, and if the third transducer head were spaced at a greater radius than that of either of the first two transducer heads, so that its track would be in the usual position of that created by the second transducer head, and if the fourth transducer head 37 were radially disposed so as to make its track in the normal position of the third transducer head, then the intelligence recorded would be completely "scrambled."

In such a case, the signals could be unscrambled only if played back with a device wherein the heads were located at exactly the same radii as in the machine on which they were made, and the tracks were started so synchronized that the head that played the track corresponded exactly to the head that recorded it.

The system of "scrambling" by the transducer heads being mounted at different radii could also be combined with one wherein the transducer heads were located at angles of rotation different from 90°, thus producing irregularly spaced tracks on the tape.

Consideration will now be given generally to the dimensions and speed of the improved long playing recorder herein disclosed. It has been found that a recording tape speed resulting in from 10 to 50 tracks per minute will generally be practical depending on the width of track needed for registration of a strong enough signal and the amount of cross-talk that can be tolerated. If it be assumed that a tape speed of 20 lines per inch is employed, for good quality sound reproduction together with a .030″ width of track, and that the tape is three inches in width, then each arcuate track across the tape will be approximately 3½″ long, when four recording heads swinging at a radius of 2″ are used. Therefore, on each inch of tape there will be 20 curved cross tracks, or 65 inches in length of sound tracks. This corresponds to about 16 seconds of recording time per inch of tape length, or one minute in a little less than 4 inches of tape.

Further assuming that the tape is in the order of .002″ thick and wound on a reel having a spindle diameter of 1″ up to a maximum diameter of 5″, about 800 layers of tape of the average diameter of 3″ could be contained on the reel, which is equivalent to a length of about 7500″ of tape. About 31 hours of recording could thus be made on this 5″ diameter reel of tape.

It is to be noted that since there are about 16 seconds of recording time on an inch of tape length, it will be very easy accurately to locate any particular portion of the material which has been recorded, particularly if the back of the tape has previously been printed with numbers at regular intervals. By having a speed-up available on the reels, it will be evident that an entire length of recorded tape may readily be wound and rewound at a rate permitting rapid observation of the printed scale on the tape so that any particular portion or portions may be selected for reproduction.

Another advantage of the improved apparatus herein described is that two or more sound channels may be recorded concurrently.

A further advantage of the improved recorder resides in the fact that the pressure plate and gate mechanism may be easily raised, allowing for ease of insertion or removal of the tape even by inexperienced operators.

A further advantage resides in the fact that the length of recording time can be extended merely by splicing the tape and increasing the diameter of the reels.

A further advantage is that a recording need never be interrupted to add recording tape regardless of its length, since the tape can easily be joined at any time prior to its passage through the gate.

A further advantage resides in the fact that the device operates at slow speed, resulting in minimum wear and tear upon, and consequent maximum life of the working parts.

A further advantage is that any short portion of the tape may readily be removed and folded for mailing or filing for playing back at any future date in any different location.

A further advantage is that very long recordings may be made without attention.

While there have been disclosed in this specification two forms in which the invention may be embodied, it is to be understood that these forms are shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a long playing magnetic tape recording and reproducing apparatus employing drive means for longitudinally advancing a relatively wide magnetic tape through the apparatus, a turntable having a plurality of electromagnetic transducer heads radially spaced apart located below the path of said tape, means responsive to said drive means for rotating said turntable in timed relation with respect to the speed of said tape, and resilient means above said tape to press it down into contact with said heads so as to trace a series of transverse parallel arcuate recorded tracks on said tape.

2. The invention as defined in claim 1, wherein said heads are symmetrically spaced around the axis of rotation of said turntable, and are all located at the same distance from said axis.

3. The invention as defined in claim 1, wherein said heads are located at varying distances from the axis of said turntable to cause the intelligence recorded on said tape to be "scrambled."

4. The invention as defined in claim 1, wherein the width of said tape and the arcuate paths traversed by said heads are so related that when one head leaves the tape at the end of its arcuate passage, the next following head will just begin its path over the tape.

5. The invention as defined in claim 1, in which said turntable comprises a relatively heavy casting in which said heads are mounted, an inverted shell of ferrous metal covering said casting, said shell having an upper raised annular rib provided with slots through which said transducer heads project into contact with said tape, said shell serving as a magnetic shield.

6. The invention as defined in claim 1, in which provision is made of a tape feed reel, a tape take-up reel connected to said drive means, and a friction slip clutch in said take-up reel to compensate for the increasing diameter of tape wound on said take-up reel.

7. The invention as defined in claim 6, in which said casting has a polygonal wall upon the outside of which said heads are mounted.

8. The invention as defined in claim 1, wherein said tape-advancing drive means comprises a driven horizontal roller over a portion of which said tape passes, and an idler pressure roller resilienty pressing said tape against said driven roller, the axis of both rollers being parallel.

9. The invention as defined in claim 8, in which said pressure roller is provided with a series of spaced circular rubber rings to increase the friction on said tape.

10. The invention as defined in claim 6, in which tension means is provided between the tape feed reel and the turntable for maintaining said tape taut as it passes thereover.

11. The invention as defined in claim 10, in which said tension means comprises a tension roller mounted to rotate on a fixed axis, a yieldable friction roller resiliently mounted below said tape, and a retractable auxiliary guide roller movably mounted above said tape for pressing it against said fixed tension roller and said friction roller to increase the wrap of said tape around said tension roller.

12. The invention as defined in claim 11, in which said fixed axis tension roller has an end flange and is canted to cause said tape to abut said flange at all times.

13. The invention as defined in claim 11, in which manually operated cam-and-toggle mechanism is provided to simultaneously raise said resilient means, said auxiliary roller, and said pressure roller from said tape when it is desired to thread said tape rapidly through the apparatus.

14. The invention as defined in claim 11, in which said auxiliary guide roller is provided with a series of spaced circular rubber rings to increase the friction on said tape.

15. The invention as defined in claim 1, in which said resilient means is supported by a depressible plate, and provision is made in front and behind said resilient means, of a pair of idler rollers mounted in said plate for pressing on said tape.

16. The invention as defined in claim 15, in which the forward idler roller is eccentrically mounted in said plate, whereby the length of said tape between the recording point and the drive roller may be varied to adjust the synchronism of the recorded tracks with the transducer heads.

17. The invention as defined in claim 5, in which a slip ring is provided on the bottom of said turntable casting and electrically connected with said heads, said slip ring being electrically connected by a switch to a high gain amplifier, associated with a microphone and a loud speaker hookup.

18. The invention as defined in claim 2, in which said symmetrically spaced heads are arranged in two alternated sets whereby at least two magnetic tracks may be simultaneously traced on said tape.

19. The invention as defined in claim 2 in which said symmetrically spaced heads are arranged in two alternated sets whereby a plurality of magnetic tracks may be simultaneously traced on said tape, and in which a like number of slip rings, amplifiers, and microphone-loud-speaker hookups are provided.

20. The invention as defined in claim 15, in which provision is made of a rigid guide bar, the bottom of said bar being located on the same level as the bottom of the rear idler roller.

21. In a scanning mechanism for a long playing magnetic tape recorder of the type comprising a drive roller for advancing a magnetic tape longitudinally, and having a magnetic recording head adjacent the path of the advancing tape, a depressible gate for pressing said tape against said recording head, a pressure roller for pressing said tape against said drive roller to cause said tape to advance at its normal slow speed during recording or playback, and manually operated means to disengage said pressure roller from said drive roller, to permit said tape to be manually moved rapidly between said pressure gate and said magnetic head for scanning.

22. In a scanning mechanism for a long playing magnetic tape recorder of the type comprising a drive roller for advancing a magnetic tape longitudinally, and having a magnetic recording head adjacent the path of the advancing tape, a depressible gate for pressing said tape against said recording head, a pressure roller for pressing said tape against said drive roller to cause said tape to advance at its normal slow speed during recording or playback, and manually operated means to raise said pressure roller from said drive roller, to permit said tape to be manually moved rapidly between said pressure gate and said magnetic head for scanning.

References Cited in the file of this patent

UNITED STATES PATENTS

| | | |
|---|---|---|
| 2,245,286 | Marzocchi | June 10, 1941 |
| 2,538,893 | Begun | Jan. 23, 1950 |
| 2,648,589 | Hickman | Aug. 11, 1953 |

FOREIGN PATENTS

| | | |
|---|---|---|
| 899,195 | France | July 31, 1944 |

Disclaimer 2,750,449.—*Lincoln Thompson*, Cheshire, *Frank E. Runge*, Branford, and *William H. Lyon*, Orange, Conn. LONG PLAYING MAGNETIC TAPE RECORDER. Patent dated June 12, 1956. Disclaimer filed Feb. 18, 1963, by the assignee, *The Soundscriber Corporation.*

Hereby enters this disclaimer to claim 22 of said patent.

[*Official Gazette May 21, 1963.*]